March 20, 1956 J. A. BOYAJEAN 2,738,730

METHOD FOR FORMING ENGRAVED IMAGE-REPRODUCING PLATES

Filed July 1, 1952 2 Sheets-Sheet 1

*INVENTOR.*
JOHN A. BOYAJEAN

BY Laurence B. Dodds
ATTORNEY

*INVENTOR.*
JOHN A. BOYAJEAN
BY Laurence B. Dodds
ATTORNEY

United States Patent Office 2,738,730 Patented Mar. 20, 1956

2,738,730

METHOD FOR FORMING ENGRAVED IMAGE-REPRODUCING PLATES

John A. Boyajean, Huntington, N. Y., assignor to Fairchild Camera and Instrument Corporation, a corporation of Delaware Application July 1, 1952, Serial No. 296,592

4 Claims. (Cl. 101—401.1)

This invention relates to engraved image-reproducing plates and to a stylus and a method for forming the same and, more particularly, to such plates of the type suitable for engraving by the apparatus described and claimed in applicant's prior Patent No. 2,575,546.

In the engraving of plates by apparatus of the general type described in aforesaid Patent No. 2,575,546, it is usually proposed to employ an engraving stylus having a pyramidal or conical deforming point. While such a stylus is entirely satisfactory for many applications, the plate engraved thereby has certain characteristics which are not ideal for some applications. For example, a stylus with a pyramidal deforming point has a penetration-printing surface characteristic which follows approximately an inverse square-law curve over the portion of the penetration range corresponding to the darker shades of the image being reproduced, while for some applications it is desirable to have a different characteristic over this portion of the range, for example, a linear characteristic.

In addition, engraved plates formed with a pyramidal stylus comprise, in the highlight sections of the image, a series of islands or plateaus separated by a series of relatively deep polygonal pits. Between each pair of diagonally adjacent islands is a connecting ridge or barrier having a shallow-V profile. These connecting ridges are undesirable in the case of plates used for pressing stereotyped mats, since they impede the flow of the fibrous mat material to fill all of the intervening pits, so that the faces of the printing islands are not sharply defined. Furthermore, for a given surface area removal, the intervening pits are made relatively deep in order that the depressions in diagonally located connecting ridges, which are only half as deep, are deep enough. Therefore, the slopes of the faces of the islands become so steep as to reduce the rigidity of these printing islands, which is undesirable either in printing directly from the plates or in pressing stereotyped mats.

It is an object of the present invention, therefore, to provide a new and improved method for forming engraved image-reproducing plates which obviates one or more of the above-mentioned disadvantages of prior methods employing prior styli, such as pyramidal styli.

It is another object of the invention to provide a new and improved method for forming an engraved image-reproducing plate and stylus and method for forming the same which is characterized by elemental printing surfaces separated by troughs of equal depths in all directions.

It is another object of the invention to provide a new and improved method for forming an engraved image-reproducing plate which is characterized by elemental printing surfaces having sharply defined faces of maximum slope for any given depth of separating troughs.

It is still another object of the invention to provide a new and improved method for forming an engraved image-reproducing plate which is characterized by a penetration-printing surface characteristic which is approximately linear over the major portion of the image brightness range.

Further in accordance with the invention, a method of forming a thermally deformable plate for reproducing images by printing processes comprises thermally acting upon the plate to form a series of elemental deformations in a line, each deformation comprising a plurality of intersecting dihedral troughs, thermally acting upon the plate to form a plurality of other lines of similar elemental deformations parallel to said first line with the adjacent troughs of each line overlapping each other and the transverse troughs of one line overlapping corresponding troughs of an adjacent line, and varying the depth of the troughs of each elemental deformation with the image brightness at that point.

For a better understanding of the present invention, together with other and further objects thereof, reference is had to the following description taken in connection with the accompanying drawings, while its scope will be pointed out in the appended claims.

Fig. 1 of the drawings is a perspective view of a conventional pyramidal engraving stylus of the prior art;

Figure 1:
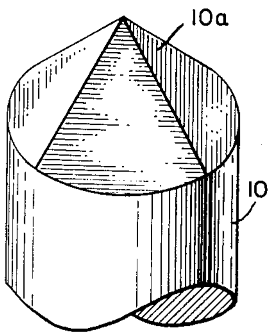
Figure 2:
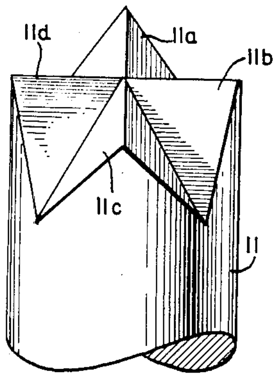
Fig. 2 is a similar view of a four-ridged or star engraving stylus suitable for use in practicing the method of the invention.
Figure 3:
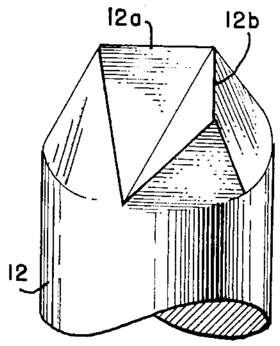
Fig. 3 is a similar view of a two-ridged engraving stylus suitable for use in practicing the method of another form of the invention.
Figure 4A:
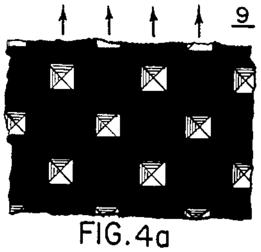
Figure 5A:
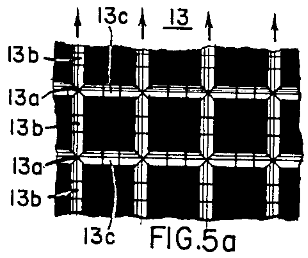
Figure 4B:
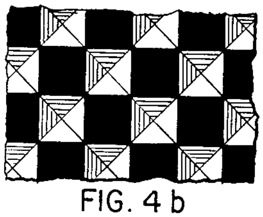
Figure 5B:
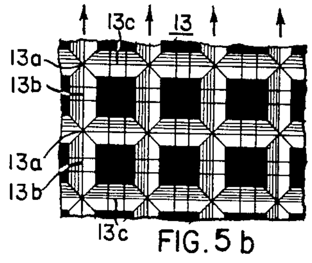
Figure 4C:
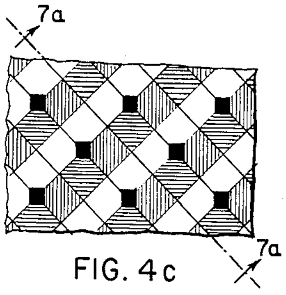
Figure 5C:
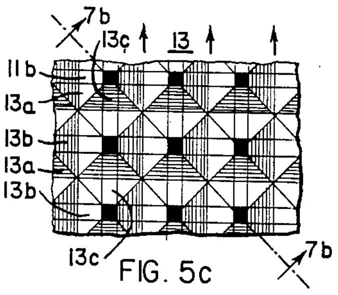
Figure 7A:
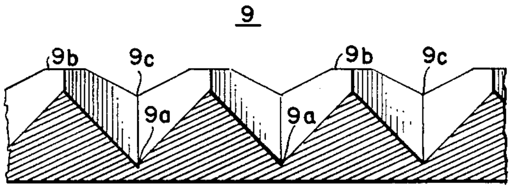
Figure 7B:
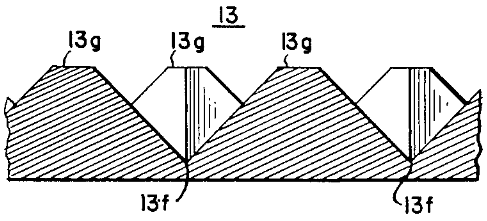
Figure 8:
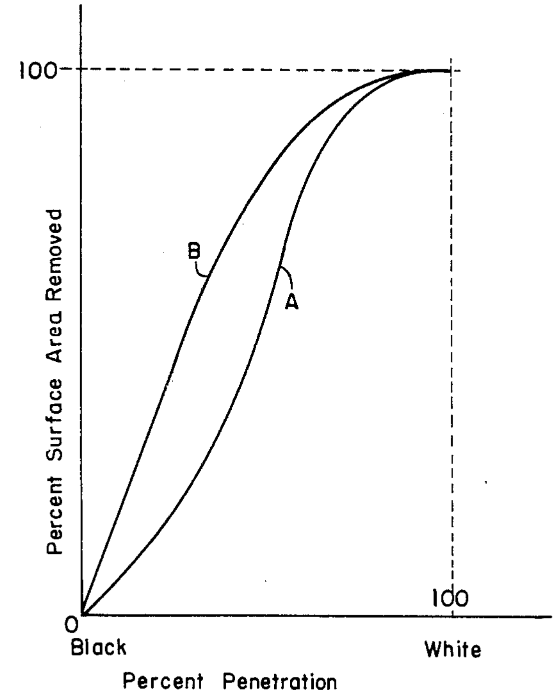

Figs. 4*a*–4*c*, inclusive, 5*a*–5*c*, inclusive, and 6*a*–6*c*, inclusive, are enlarged fragmentary views of plates engraved by the styli of Figs. 1, 2, and 3, respectively;

Figs. 7*a* and 7*b* are cross-sectional views of the plates represented by Figs. 4*c* and 5*c*, respectively; while Fig. 8 is a graph representing penetration-printing surface characteristics of the styli of Figs. 1 and 2.

Referring now to Fig. 1 of the drawings, there is illustrated a simple stylus 10 having a tetrahedral or pyramidal tip **10*a* of a type heretofore proposed for use in machines of the general character of the aforesaid Patent No. 2,575,546. When used in such a machine for engraving a plate of thermally deformable material, there is formed a plate 9** having a screen pattern of the character illustrated in Figs. 4*a*, 4*b*, and 4*c*, representing a very dark portion, a medium-brightness portion, and a highlight portion, respectively, of an image to be reproduced, the arrows indicating the direction of scanning. In accordance with usual practice, the deformations or pits of adjacent scanning lines are staggered. An engraved plate of this character is quite satisfactory in many applications but, as brought out hereinafter, it has certain characteristics which render it relatively less suitable for other applications.

Referring now to Fig. 2, there is illustrated a stylus suitable for use in practicing the method of the present invention and suitable for heating, as in the machine of aforesaid Patent No. 2,575,546, for engraving a plate of thermally deformable material. This stylus comprises a metallic shaft 11 terminating in a deforming tip including four uniformly angularly spaced transverse dihedral ridges **11*a*, 11*b*, 11*c*, and 11*d*. The apices of these four ridges are intersecting, preferably being normal to each other to form a symmetrical four-ridged star. In Fig. 3 is represented a stylus 12 suitable for use in practicing a modified form of the invention and comprising two abutting dihedral ridges 12*a* and 12*b*** normal to each other.

In utilizing the stylus of Fig. 2 or Fig. 3 to engrave a thermally deformable plate for reproducing images by printing processes by means of a machine of the character of aforesaid Patent No. 2,575,546, the following method may be used. The stylus 11 is oscillated at screen frequency thermally to act upon or decompose a plate to form a series of elemental deformations in a line, each deformation comprising a pair of intersecting dihedral troughs normal to each other. In Fig. 5a there is shown a deformable plate 13 including the series of deformations 13a, 13a, etc., forming the first scanning line. In this embodiment of the invention, one of the troughs of each elemental deformation includes a trough extending in the direction of the scanning line, the troughs of adjacent deformations overlapping, as indicated at 13b, 13b, to form a continuous dihedral trough in the direction of scan with a series of regularly spaced cross troughs normal to the direction of scan.

The stylus 11 then continues to scan the plate 13 to form a plurality of other lines of similar elemental deformations parallel to the first line. In this embodiment of the invention, the elemental deformations of adjacent lines are in alignment, rather than staggered, and the transverse troughs of one line preferably overlap the corresponding troughs of an adjacent line, as indicated at 13c, 13c, particularly if the shank of the stylus is cylindrical. It will be understood, of course, that as the plate 13 is engraved to reproduce an image by the machine of aforesaid Patent No. 2,575,546, the depth of the troughs of each elemental deformation is varied in accordance with the image brightness at that point so that, for an area of the image of medium brightness, the screen pattern is in the form of that shown in Fig. 5b, while a highlight area is as represented in Fig. 5c.

Figure 6A:
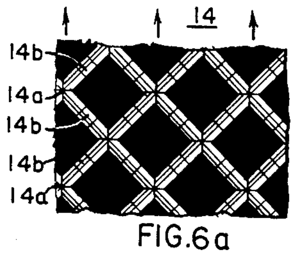
Figure 6B:
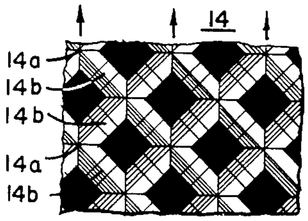
Figure 6C:
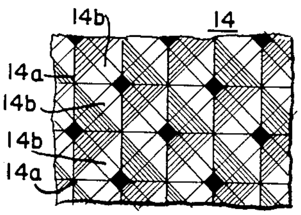

In a preferred method of engraving a thermally deformable plate, a screen pattern as represented in Figs. 6a, 6b, and 6c is obtained. In this arrangement, a thermally deformable plate 14 is first formed with a series or line of elemental deformations 14a, 14b in which each of the troughs of each deformation lies at an angle of approximately 45° to the direction of the scanning line, with the elemental deformations of each line staggered with respect to those of adjacent lines. With this type of scanning, the troughs of the elemental deformations of any given line do not overlap, but the troughs of corresponding deformations of adjacent lines do overlap, as indicated at 14b, 14b. As in the case of Figs. 5a–5c, inclusive, Figs. 6a–6c, inclusive, illustrate the screen pattern of the plate 14 for very dark image areas, areas of medium brightness, and highlight portions, respectively.

Thus, it is seen that the engraved plate for reproducing images, as represented by Figs. 5a–5c, inclusive, and Figs. 6a–6c, inclusive, comprises a sheet of thermally deformable material having a screen pattern in the form of at least two series of continuous dihedral troughs of uniform and equal depths over each elemental area of the sheet. The troughs of one series are normal to and intersect the troughs of the other series, while the depths of the troughs of each elemental area of the sheet are representative of the image brightness at that point. Since the brightness of the reproduced image varies directly with the surface area removed by engraving, the depths of the troughs vary approximately as the square root of the image brightness. In the embodiment of the invention represented by Figs. 5a–5c, inclusive, one series of troughs is parallel to the horizontal base line of the image sheet and the other series of troughs is normal to this base line, while in the embodiment of Figs. 6a–6c, inclusive, both series of troughs form an angle of substantially 45° to the horizontal base line of the sheet, and thus to the direction of scanning, while the two series of troughs are substantially normal to each other.

The image-reproducing sheet represented in Figs. 5a–5c, inclusive, and Figs. 6a–6c, inclusive, is advantageous for use where it is desired to press stereotyped mats. Referring to Figs. 7a and 7b, the former represents an enlarged cross-sectional detail of the plate of Fig. 4c along the line 7a—7a. It will be seen that, while there are deep pits 9a, 9a between adjacent printing islands or plateaus 9b, 9b in the direction of scanning and in the direction normal thereto, there are relatively shallow valleys 9c, 9c between adjacent printing islands 9b, 9b in the diagonal directions. These shallow valleys 9c, 9c are formed by barrier or connector ridges separating adjacent pits 9a, 9a in the diagonal directions. When the engraved plate is used to press a stereotyped mat, these barrier ridges impede the flow of the plastic matting material so that the sloping faces of the printing islands 9b, 9b are not sharply defined in the resulting mat and in the type metal casting made therefrom.

In Fig. 7b is shown a corresponding diagonal sectional view along the line 7b—7b of plate 13 of Fig. 5c, in which it is seen that there are deep troughs 13f, 13f of uniform depth separating the printing islands 13g, 13g and these troughs are of equal depth in all directions. With this type of plate, when used to press a stereotype mat, the plastic mat material flows freely into the deep troughs 13f, 13f to produce sharply defined faces for the printing islands 13g, 13g. Fig. 7b is also representative of a vertical sectional view of the plate of Fig. 6c.

The screen patterns represented in Figs. 5a–5c, inclusive, and Figs. 6a–6c, inclusive, also differ from those of Figs. 4a–4c, inclusive, in their penetration removed surface area characteristics, that is, in the gamma of the reproduced image. Referring to Fig. 8, curve A represents the penetration-removed surface area characteristic of the plate 9 deformed by the pyramidal stylus 10. It is to be noted that this characteristic is non-linear through the greater portion of the range of penetration, although it is approximately linear over a central portion of this range. Curve B of this figure represents the corresponding characteristic of the engraved plates 13 and 14 deformed by the four-ridged stylus 11 of Fig. 2. While this characteristic follows approximately a square law, the parameters are such that the curve is nearly linear over that half of the penetration range representing the darker portions of the image, while the curve is more sharply curved over the brighter half of the penetration range. Since the brightness of the reproduced image varies inversely with the removed surface area, the penetration over this latter portion of the range varies approximately as the square root of the brightness of the reproduced image. The characteristic represented by curve B may be useful where it is desired relatively to crush the tonal gradations in the brighter portions of the brightness range. Also, it may be useful in image-reproducing systems to compensate for complementary characteristics in other elements of the system to obtain an approximately linear overall brightness characteristic, that is, a gamma of unity throughout the brightness range. Use of the styli of the invention permits a shift of the unity gamma portion of the response characteristic to obtain a resultant characteristic best suited for each application.

The screen patterns formed by the two-ridged star of Fig. 3 in which the scanning is adjusted so that the troughs of adjacent lines formed thereby are abutting are substantially identical to those represented by Figs. 5a–5c, inclusive, or Figs. 6a–6c, inclusive, depending upon whether the ridges are oriented in line with an normal to the direction of scan, or at an angle of 45° thereto. However, the pattern formed by the two-ridged star stylus of Fig. 3 is finer in line and less contrasting, particularly in the darker area of the image. This is believed to be due to the avoidance of irregularities occasioned by slight misalignment of the overlapping deformations of adjacent lines, as in the case of the four-ridged star of Fig. 2. If the four-ridged star 11 has a cylindrical shank, its diameter is preferably made 1.4 times the distance between successive deformations along a diagonal of the engraved plate, while the two-ridged star of Fig. 3 is preferably given a diameter equal to twice this distance.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of forming a thermally deformable plate for reproducing images by printing processes comprising: thermally acting upon the plate to form a series of elemental deformations in a line, each deformation comprising a plurality of intersecting dihedral troughs; thermally acting upon the plate to form a plurality of other lines of similar elemental deformations parallel to said first line with the adjacent troughs of each line overlapping each other and the transverse troughs of one line overlapping corresponding troughs of an adjacent line; and varying the depth of the troughs of each elemental deformation with the image brightness at that point.

2. The method of forming a thermally deformable plate for reproducing images by printing processes comprising: thermally acting upon the plate to form a series of elemental deformations in a line, each deformation comprising a pair of intersecting dihedral troughs normal to each other; thermally acting upon the plate to form a plurality of other lines of similar elemental deformations parallel to said first line with the adjacent troughs of each line overlapping each other and the transverse troughs of one line overlapping corresponding troughs of an adjacent line; and varying the depth of the troughs of each elemental deformation with the image brightness at that point.

3. The method of forming a thermally deformable plate for reproducing images by printing processes comprising: thermally acting upon the plate to form a series of elemental deformations in a line, each deformation comprising a pair of intersecting dihedral troughs normal to each other, one trough of each deformation extending in the direction of said line; thermally acting upon the plate to form a plurality of other lines of similar elemental deformations parallel to said first line with the adjacent troughs of each line overlapping each other and the transverse troughs of one line overlapping corresponding troughs of an adjacent line; and varying the depth of the troughs of each elemental deformation with the image brightness at that point.

4. The method of forming a thermally deformable plate for reproducing images by printing processes comprising: thermally acting upon the plate to form a series of elemental deformations in a line, each deformation comprising a pair of intersecting dihedral troughs normal to each other, each of said troughs lying at an angle of approximately 45° to the direction of said line; thermally acting upon the plate to form a plurality of other lines of similar elemental deformations parallel to said first line with the adjacent troughs of each line overlapping each other and the elemental deformations of one line staggered with respect to those of adjacent lines and the troughs of one line overlapping corresponding troughs of an adjacent line; and varying the depth of the troughs of each elemental deformation with the image brightness at that point.

References Cited in the file of this patent

UNITED STATES PATENTS

| | | |
|---|---|---|
| 114,446 | Kenney | May 2, 1871 |
| 815,002 | Baney et al. | Mar. 13, 1906 |
| 1,650,492 | Coaton | Nov. 22, 1927 |
| 2,047,851 | Bennett | July 14, 1936 |
| 2,063,614 | McFarlane et al. | Dec. 8, 1936 |
| 2,083,798 | Greenberg | July 13, 1937 |
| 2,179,002 | Washington | Nov. 7, 1939 |
| 2,238,601 | Reynolds | Apr. 15, 1941 |
| 2,575,546 | Boyajean | Nov. 20, 1951 |